3,565,723
PROCESS FOR MAKING A METAL CLAD PLASTIC LAMINATE IN WHICH A METAL SHIM IS USED TO IMPROVE THE BONDING OF THE METAL FOIL TO THE PLASTIC LAYER
Sydney Arthur Giddings, Cincinnati, and Richard Frederick Jaisle, Harrison, Ohio, assignors to Formica Corporation, Cincinnati, Ohio, a corporation of Delaware
No Drawing. Filed Oct. 23, 1968, Ser. No. 770,078
Int. Cl. C09j 5/00
U.S. Cl. 156—311                                10 Claims

ABSTRACT OF THE DISCLOSURE

The disclosure is a process for making a metal clad plastic laminate, in which wrinkling of the plastic layer is avoided. A metal shim is placed on a thermoplastic layer which is on a metal layer, and the assembly is moved through a laminating device which comprises a pair of continuous metal belts. The assembly is introduced into the nip between the belts and is heated, densified and cooled while passing through the device. The metal shim is then removed.

BACKGROUND OF THE INVENTION

Metal clad laminates are used in both flexible and rigid circuit production. These laminates are also useful especially when the metal foil is an aluminum foil in producing panels which are etched and back-lighted. In the past considerable difficulty had been experienced in endeavoring to produce such laminates since the plastic layer had tendencies to wrinkle; thereby producing a metal foil plastic laminate with undesirable properties. The present invention obviates these shortcomings of the prior art.

FIELD OF THE INVENTION

The present invention is in the field of metal foil clad plastic laminates in which a metal foil layer and a layer of synthetic thermoplastic polymeric material are bonded together to produce a wrinkle-free laminate which has a plurality of industrial uses particularly in the field of electricity circuitry.

DESCRIPTION OF THE PRIOR ART

The closest prior art of which the instant applicants are aware are the U.S. Pat. 3,286,008 and the U.S. Pat. 3,159,526 which is cited therein. Each of these references are incorporated herein by reference.

SUMMARY OF THE INVENTION

This invention relates to a process for making a metal clad plastic laminate comprising assembling a metal foil layer and a layer of a synthetic thermoplastic polymer material in superimposed relationship, contacting the thermoplastic layer with a metal shim and introducing the entire assembly into the nip between a pair of flexible continuous metal belts, heating the synthetic polymeric thermoplastic material at least to the softening temperature of said polymeric material in a first heating zone, moving the heated assembly to a second zone while densifying the polymeric material if it is not already in a completely desified form, cooling the assembly in the densified state to a temperature below the softening temperature of the polymeric material, removing the densfied material for the densifying zone, and separating the shim from the metal clad plastic laminate thus produced.

In preparing the metal clad plastic laminates of the present invention, one may use any one of a plurality of metal foils which are available commercially from a plurality of sources. For instance one may use copper foil, aluminum foil, and the like. These foils are available commercially in a plurality of thicknesses varying between about 0.5 mil and 20 mils. It is preferred to use foils having a thickness from about 1 mil to 5 mils. Generally these foils have had a pretreatment so as to make them bondably receptive to adherence to the plastic layer. The pretreatment most frequently comprises producing a roughened surface by etching with acid or base and/or oxidation of the surface to produce an adherable oxide layer.

The plastic material to be applied in layer form to the metal foil may be any one of a plurality of plastic materials including those disclosed in the above-cited U.S. Pat. 3,286,008; but not limited to such thermoplastic materials. As used in the practice of the process of the present invention, the thermoplastic material may be in the nature of a film or a nonsintered finely-divided thermoplastic material. Additionally, the thermoplastic material may be in the nature of a nonwoven fibrillated thermoplastic fiber paper such as those described in the U.S. Pats. 2,810,646 and 3,264,170; each of which patents are incorporated herein by reference.

The essence of the present invention resides in the use of a metal shim which is positioned below or above the thermoplastic layer as it is introduced into the nip between a pair of flexible continuous belts, and is further positioned so as to be on the opposite side of the metal foil which is to be bonded to the plastic layer so as to form a sandwich in which the thermoplastic layer is positioned immediately intermediate between the metal foil and the metal shim. The metal shim acts as a rigid layer and as a heat sink to form wrinkle-free laminates from thermoplastic polymeric materials and metal foils. No adhesive is required to accomplish the bond between the metal foil and the thermoplastic layer. Ordinarily, the metal shim will be between 0.010" and 0.100" and the shim may be treated with a release agent such as silicone or fluorinated polyolefin and the like. In addition to its function in preventing wrinkling, the metal shim also reduces drastically any thermal degradation or morphological changes which may reduce the physical strength of the polymer layer.

If desired one may produce simultaneously two of these metal foil clad thermoplastic laminates by building an assembly in superimposed relationship of a bottom layer of the selected metal foil followed immediately by a layer of the thermoplastic material, such as a film of a linear thermoplastic polyester followed by the shim onto which is placed an additional layer of thermoplastic material such as the linear thermoplastic polyester resin followed by a top-most layer of the metal foil. The assembly is then introduced into the nip between a pair of flexible continuous metal belts, and heating the synthetic polymeric material at least to its softening temperature in a first heating zone and moving the heated assembly to a second heating zone while densifying the polymeric material-foil assembly so as to produce a fully densified plastic-metal foil laminate. The assembly is then passed further through a cooling zone while maintaining the assembly in a densified state in which the temperature in the cooling zone is below the softening temperature of the polymeric material. Finally, the assembly is removed from the densified zone and the metal shim is separated from the metal clad plastic laminate. The above illustration will result in the production of two metal foil clad laminates.

The polymeric material used to prepare the metal foil clad plastic laminates of the present invention may be, as has been indicated hereinabove, a thermoplastic film material or a nonsintered, finely-divided thermoplastic material. The film material is for all practical purposes considered to be fully densified whereas the nonsintered, finely-divided thermoplastic material is not considered to be fully densified. When either of these thermoplastic materials are used with the metal foil in practicing the process of the present invention, the total assembly of the plastic material and the metal foil becomes densified during the densifying step either by the sintering of the finely-divided, nonsintered material and bonding the sintered material in substantially fully densified form to the metal foil wherein substantially all of the air between the thermoplastic particles themselves and between the thermoplastic particles and the metal foil is removed or as in the case of a thermoplastic film which initially is substantially fully densified, all of the air between the film and the metal foil is substantially completely removed as the film is bonded to the metal foil and thereby the total assembly becomes substantially fully densified.

When only one unitary assembly is being processed in the practice of the process of the present invention only one of the metal belts needs to be heated at a temperature sufficient to permit the heat conduction through the metal foil to the surface of the thermoplastic film in order to achieve a bonding between the foil and the thermoplastic material during the densification step. In this approach, the metal belt contacting the metal shim not only need not be heated but is preferably not heated. On the other hand, when two units are to be consolidated simultaneously in the practice of the process of the present invention both the upper and lower metal belts should be heated to the selected temperature wherein the assembly of components introduced between the metal belts is comprised of the following units reading from bottom to top: a metal foil, a layer of a thermoplastic material, the metal shim, a further layer of the thermoplastic material and the uppermost metal foil. Upon the heat and pressure consolidation of this assembly through the densifying zone followed by the cooling zone and the removal therefrom, the metal shim is removed from the entire assembly leaving two separate laminated units each comprising a metal foil bonded securely to a thermoplastic layer which total assembly is substantially fully densified.

In order that the concept of the present invention may be more fully understood, the following examples are set forth.

EXAMPLE 1

An assembly in superimposed relationship is prepared by laying down an electrodeposited copper foil, Treatment A (0.0014") onto which is superimposed a commercially available film of a linear thermoplastic polyester resin (polyethylene terephthalate) 5 mils thick onto which is superimposed an aluminum shim of 0.020" followed by a further layer of the same thermoplastic linear polyester resin film 5 mils followed by another layer of an electrodeposited copper foil Treatment A (0.0014"). Treatment A of the electrodeposited copper is a proprietary oxide treatment of the rough surface, or the surface opposite to the electrode against which it is being deposited. The assembly is then introduced into the device disclosed in the above-cited U.S. Pat. 3,159,526 wherein the temperature in the heating zone is 490° F. and the gap at the nip is 0.030". The original opening at the steps is 0.040" upper, and 0.040" lower. The speed of the moving belts upper and lower is uniform and move at the rate of 5 feet per minute. The polyester resin film fused to the treated side of the copper-peel strength is greater than 15 pounds per inch. Fusion to the bright side (or the side adjacent to the electrode used in the deposition) of the copper produced a bond of 9 pounds per inch.

EXAMPLE 2

Example 1 is repeated in all essential details except that in the place of the copper electrodeposited there is used rolled copper which is produced by singly rolling out a copper ingot with hot rolls and finally through cold rolls. No post-treatment of the copper foil is carried out. Bonds developed were 12–14 pounds per inch.

EXAMPLE 3

Example 2 is repeated in all essential details except that the linear polyester resin film was 2 mils thick and the gap at the nip was 0.024".

EXAMPLE 4

Example 3 is repeated in all essential details except that in the place of the linear thermoplastic polyester resin there is used a commercially available fluorinated ethylene propylene film.

EXAMPLE 5

An assembly is prepared by superimposing on aluminum foil (0.002", rolled to a hard finish) a layer of a polyacrylonitrile fibrillated fiber paper (U.S. Pats. No. 2,810,646 and 3,264,170) followed by an aluminum shim 0.040" in thickness, followed by an additional layer of polyacrylonitrile acrylic fiber paper onto which is superimposed an additional layer of the aluminum foil. The temperature in the heating zone is about 500° F.; the gap at the nip is 0.044"; and the steps are 0.020" upper, and 0.020" lower. The speed was 5 feet per minute and upon removal of the assembly from the apparatus and the removal of the metal shim, a well bonded laminate is obtained.

We claim:

1. A process for making a metal clad plastic laminate comprising assembling a metal foil layer and a layer of a synthetic thermoplastic polymer material in superimposed relationship, contacting the thermoplastic layer with a metal shim and introducing the entire assembly into the nip between a pair of flexible continuous metal belts, heating the synthetic polymeric thermoplastic material at least to the softening temperature of said polymeric material in a first heating zone, moving the heated assembly to a second zone while densifying the polymeric material-metal foil assembly, cooling the assembly in the densified state to a temperature below the softening temperature of the polymeric material, removing the densified material from the densifying zone, and separating the shim from the metal clad plastic laminate thus produced.

2. The process according to claim 1 in which the assembly is comprised of a metal foil layer, a thermoplastic polymeric layer, a metal shim, a thermoplastic polymeric layer and a metal foil layer in that order.

3. The process according to claim 1 in which the synthetic thermoplastic material is a biaxially oriented polyethylene terephthalate polyester resin film.

4. The process according to claim 2 in which the synthetic thermoplastic material is a biaxially oriented polyethylene terephthalate polyester resin film.

5. The process according to claim 1 in which the synthetic thermoplastic polymeric material is polyacrylonitrile.

6. The process according to claim 1 in which the metal foil is rolled copper foil.

7. The process according to claim 1 in which the metal foil is an aluminum foil.

8. The process according to claim 3 in which the metal foil is a rolled copper foil.

9. The process according to claim 5 in which the metal foil is a rolled copper foil.

10. The process according to claim 3 in which the metal foil is an aluminum foil.

References Cited

UNITED STATES PATENTS

| | | | |
|---|---|---|---|
| 2,186,954 | 1/1940 | Boughton et al. | 156—311X |
| 2,418,233 | 4/1947 | McClary | 156—311X |
| 2,568,463 | 9/1951 | Reynolds | 156—152 |
| 2,702,580 | 2/1955 | Bateman | 156—310X |
| 2,817,618 | 12/1957 | Hahn | 156—209 |
| 2,877,151 | 3/1959 | Doherty et al. | 156—209 |
| 3,286,008 | 11/1966 | Power et al. | 264—126 |

REUBEN EPSTEIN, Primary Examiner

U.S. Cl. X.R.

156—247; 161—216